March 19, 1935.  G. VON WEBERN ET AL  1,994,493
APPARATUS FOR GRAINING
Filed Dec. 7, 1932  7 Sheets-Sheet 1

Inventors
Guido Von Webern
Edward W. Hamant
By Bates, Goldrick & Teare
Attorneys March 19, 1935. G. VON WEBERN ET AL 1,994,493
APPARATUS FOR GRAINING
Filed Dec. 7, 1932    7 Sheets-Sheet 3

Inventors
Guido Von Webern
Edward W. Hamant
By Bates, Goldrick & Teare
Attorneys March 19, 1935.  G. VON WEBERN ET AL  1,994,493
APPARATUS FOR GRAINING
Filed Dec. 7, 1932  7 Sheets-Sheet 7

Inventors
Guido Von Webern
Edward W. Hamant
By Bates, Goldrick & Teare
Attorneys Patented Mar. 19, 1935

1,994,493

UNITED STATES PATENT OFFICE 1,994,493

APPARATUS FOR GRAINING

Guido von Webern and Edward W. Hamant, Dayton, Ohio, assignors to Oxford Varnish Corporation, Detroit, Mich., a corporation of Michigan Application December 7, 1932, Serial No. 646,090

14 Claims. (Cl. 101—154)

An object of this invention is to provide an improved graining machine for transferring patterns, such as wood grain and marble for example, to metal panels and the like. This application is a continuation in part of our copending application Serial No. 445,643, which application resulted in Patent No. 1,894,966.

A specific object is to provide a graining machine which will effectively handle large blanks varying greatly in thickness.

A further object is to provide for supporting blanks to be grained in such manner that notwithstanding large surface areas, accurate printing contact will be maintained.

Still another object is to provide an improved automatically operated work feeding arrangement for a graining machine, particularly adapted to operate on very large work blanks.

A further object is to provide an improved driving device for a conveyor in a graining machine, whereby the conveyor may be raised and lowered substantial distances without having to make complicated adjustments and without having to remove and replace parts of the machine.

A feature of this graining machine is the driving of the pattern roll and the work-supporting conveyor in timed relation to each other. Provision is then made for exactly feeding work pieces along the conveyor so that they will receive an impression from a predetermined portion of the pattern roll. Thus substantially exact duplicates may be obtained, or the feeding devices may be positioned to obtain many variations in pattern, or a plurality of fixed feeding positions may be predetermined and sets of blanks may be printed, one in each position.

Other objects and features of the invention will become apparent from the following description relating to the accompanying drawings showing the preferred forms. The essential characteristics are summarized in the claims.

Figure 1:
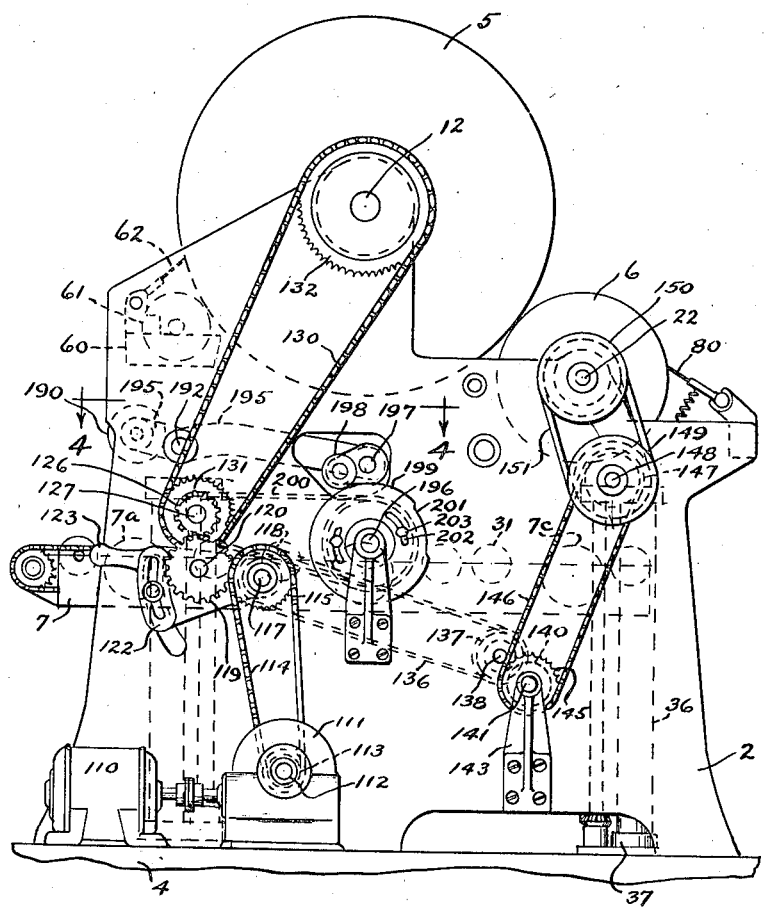
Figure 2:
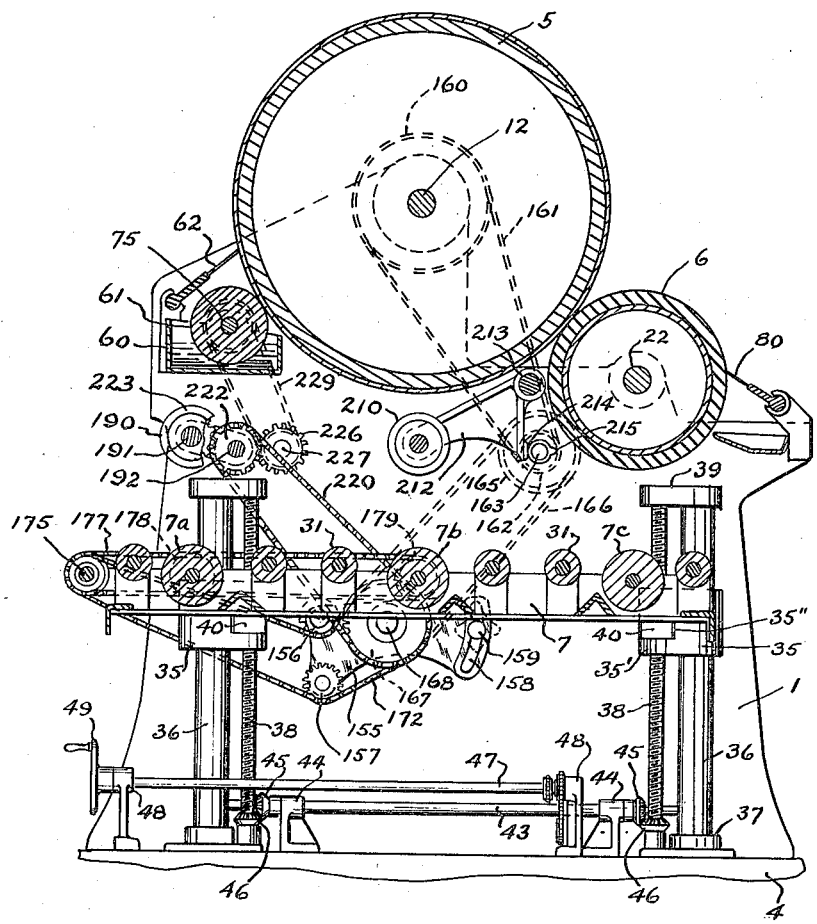
Figure 3:
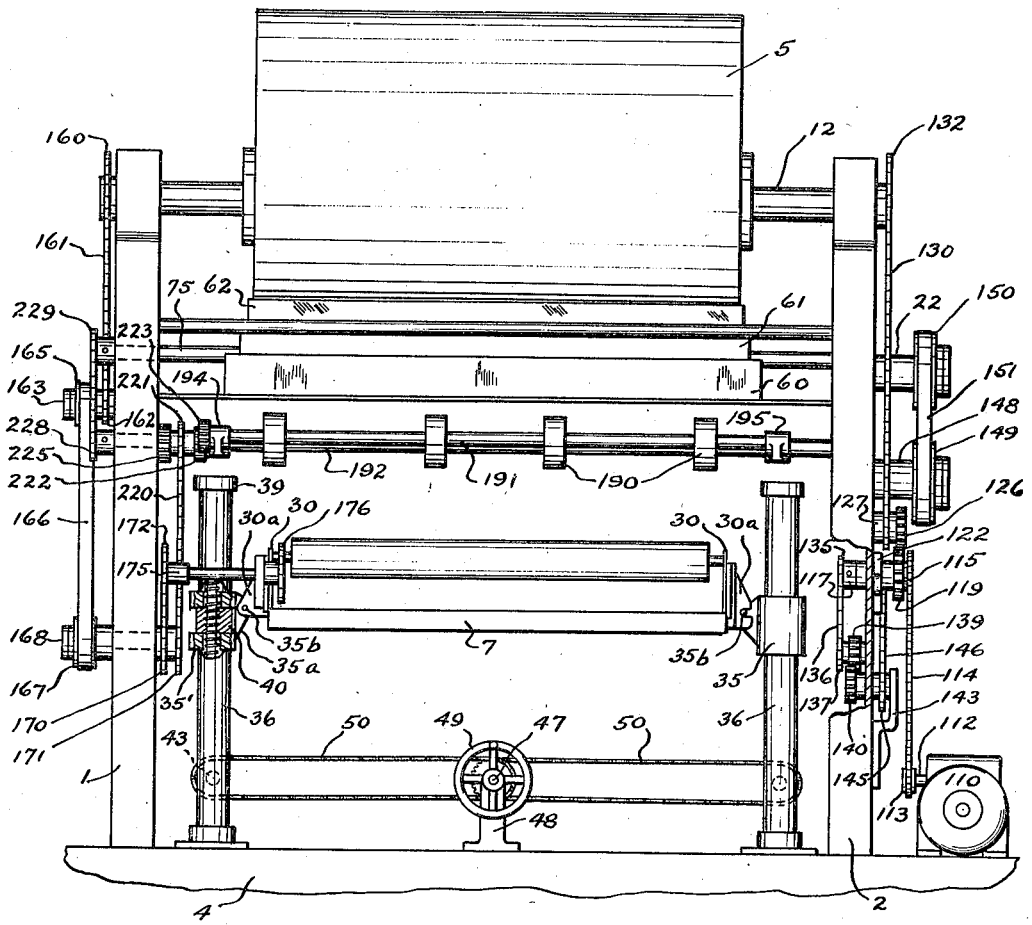
Figure 4:
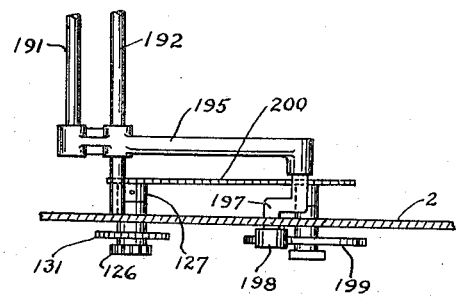
Figure 5:
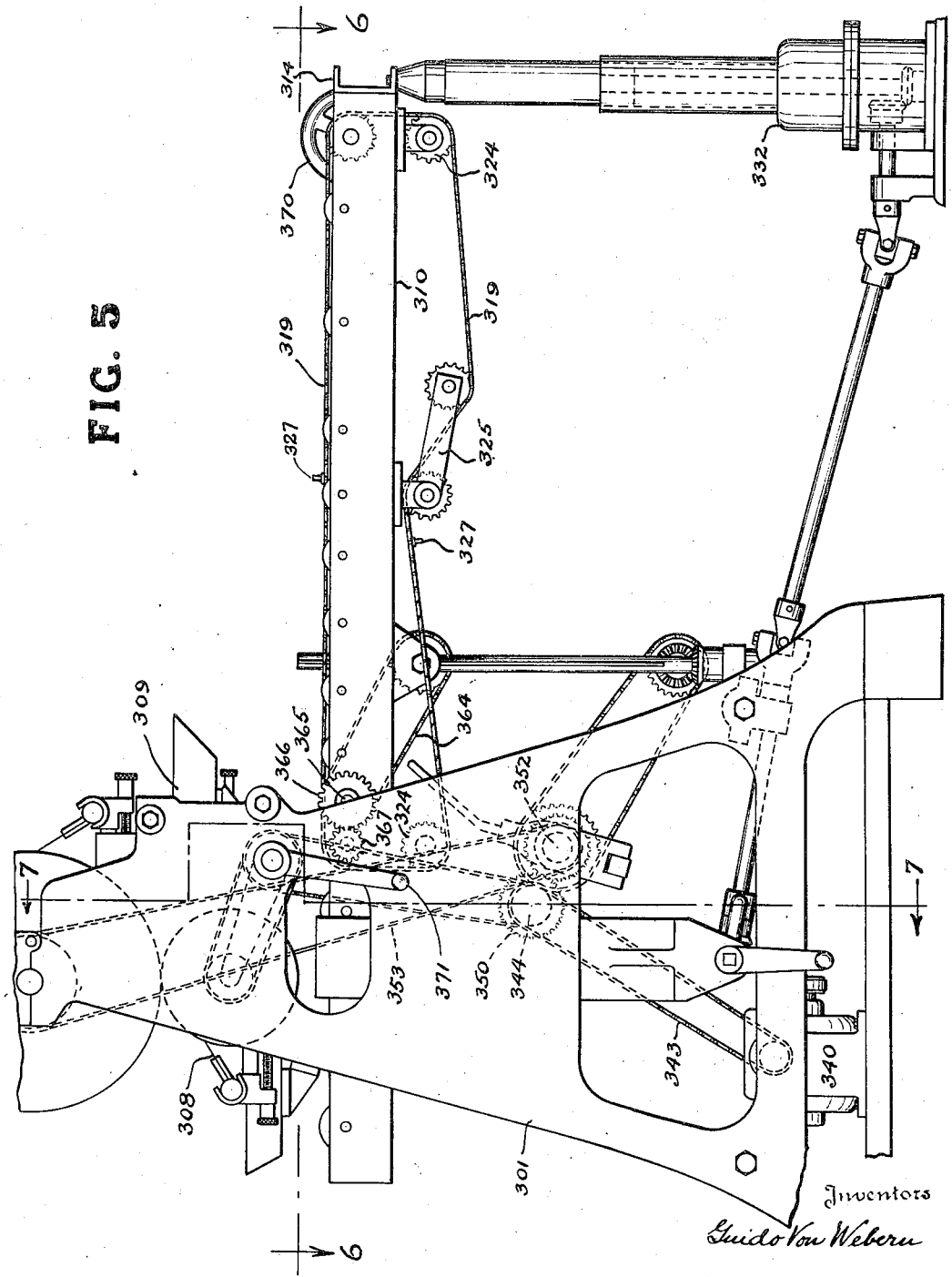
Figure 6:
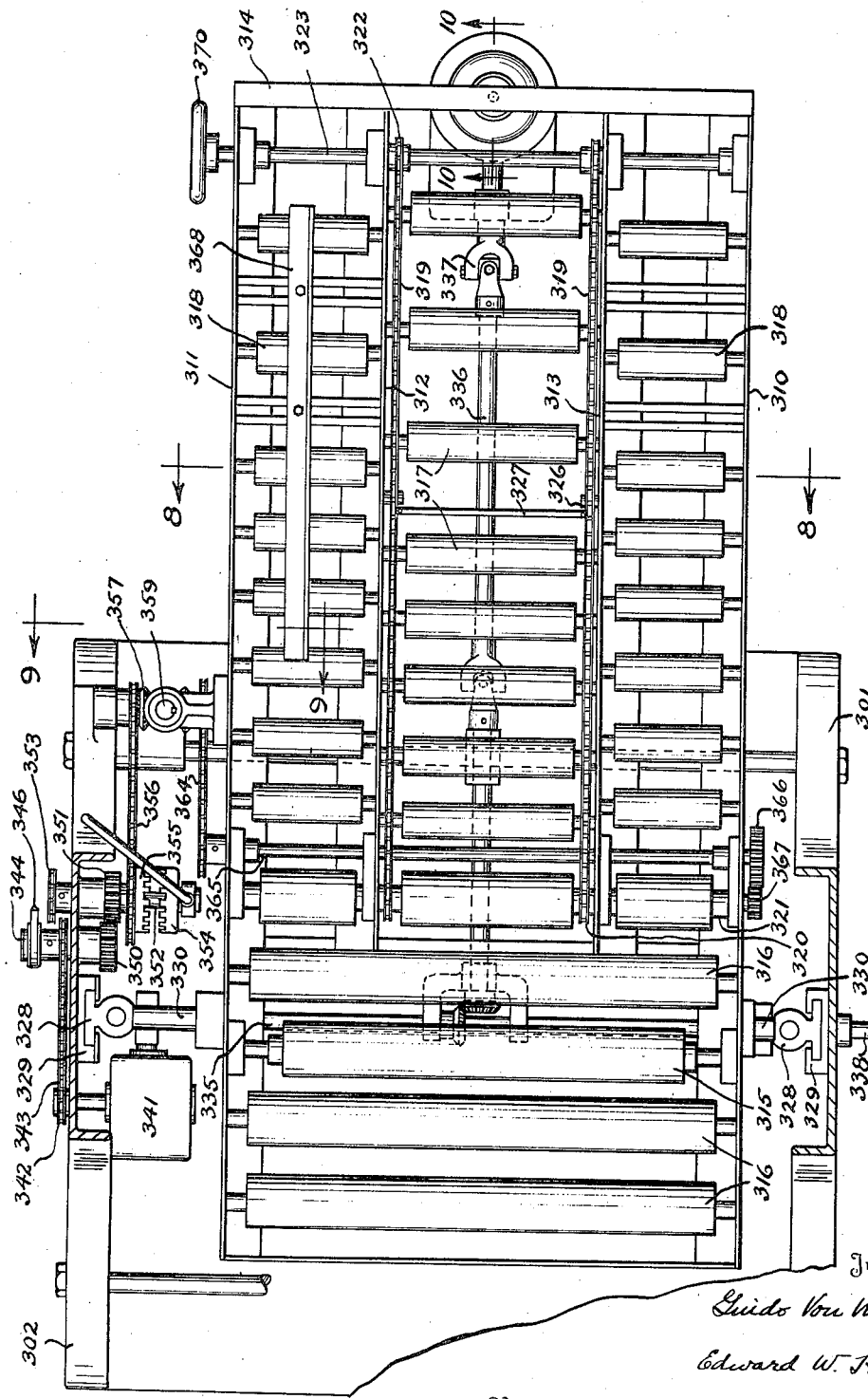
Figure 7:
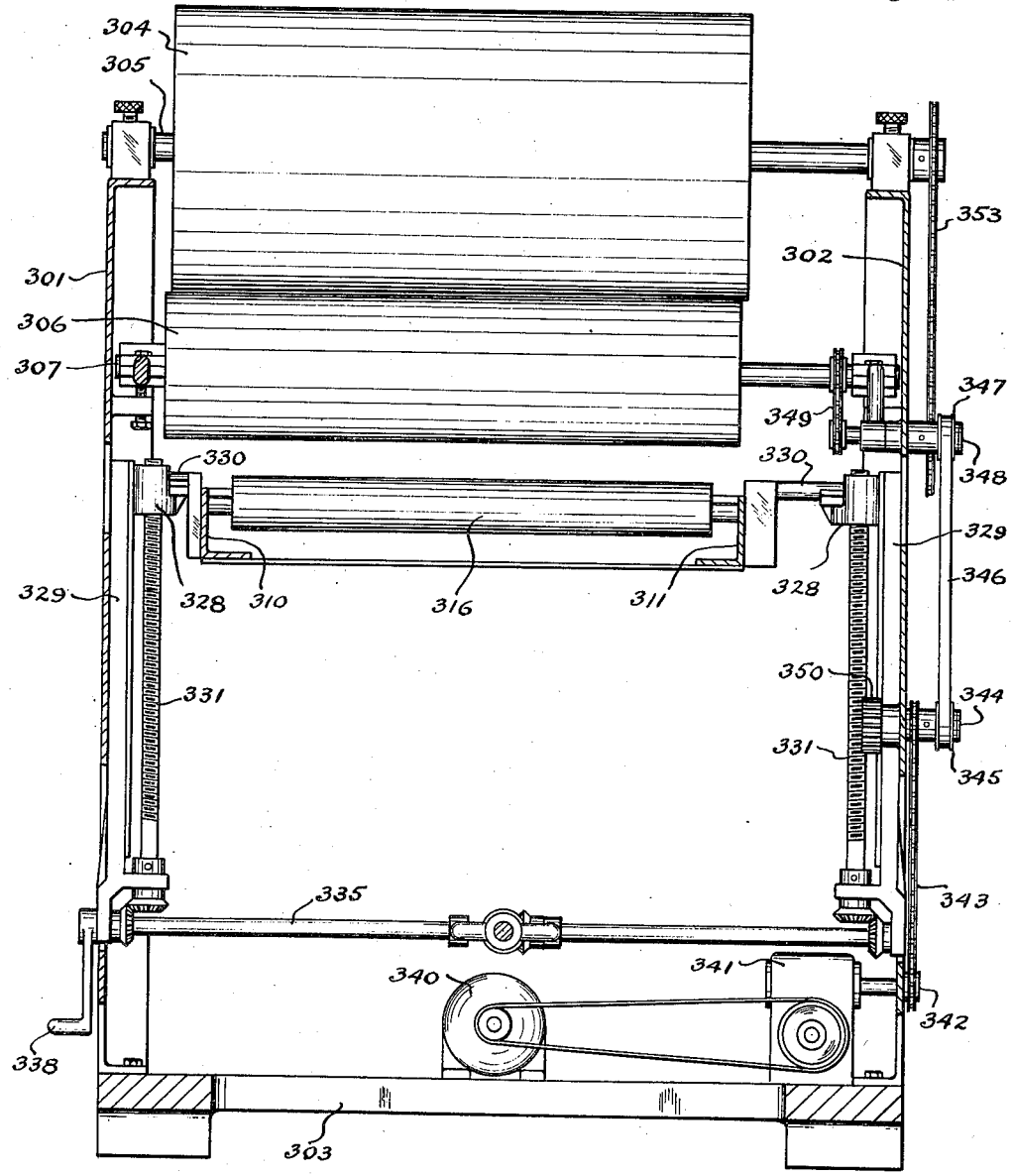
Figure 8:
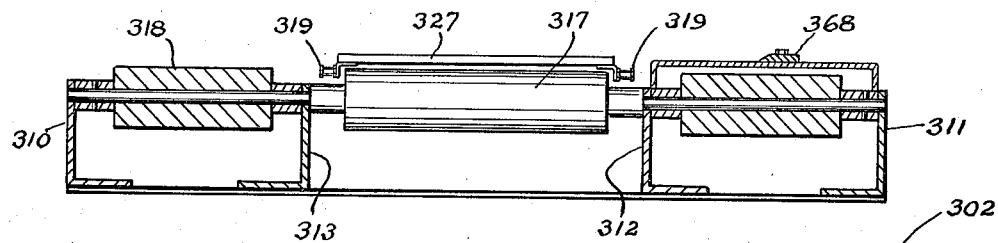
Figure 9:
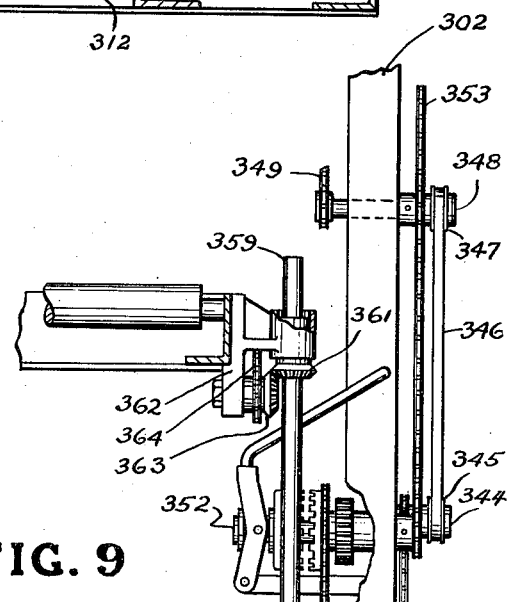
Figure 10:
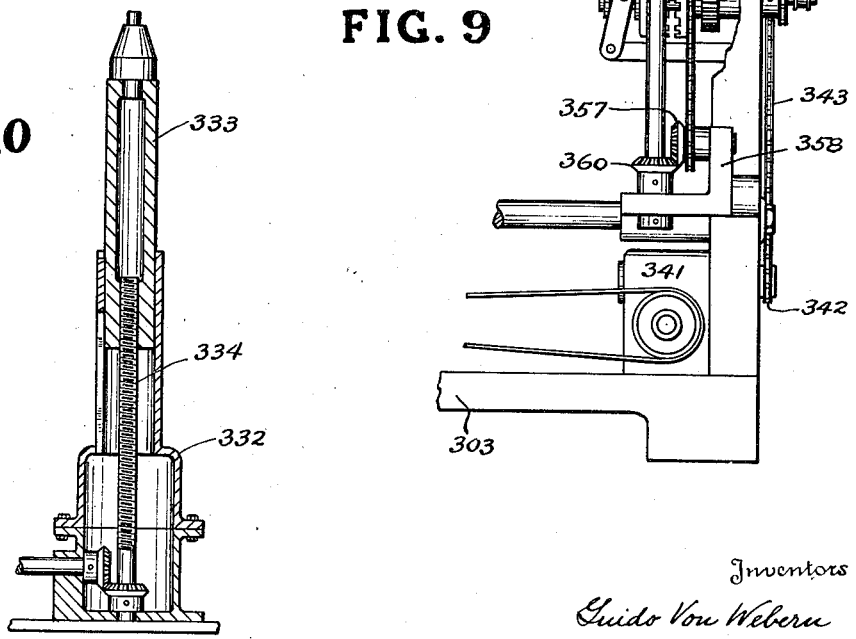

In the drawings, Fig. 1 is a side elevation of a machine showing one embodiment of our invention. Fig. 2 is a longitudinal section through the machine of Fig. 1. Fig. 3 is an end elevation of the machine of Figs. 1 and 2. Fig. 4 is a partial sectional view along the lines 4—4 of Fig. 1. Figs. 5 to 10 illustrate another machine embodying our invention. Fig. 5 is a side elevation of the modification. Fig. 6 is a plan view, partially in section along the line 6—6 of Fig. 5. Fig. 7 is a vertical section along the line 7—7 of Fig. 5; while Figs. 8, 9 and 10 are sectional views along similarly numbered lines of Fig. 6.

Referring in detail to the drawings, and first to Fig. 1, substantially all the major parts of the machine are supported on side frame members, designated 1 and 2, which rest on and are connected by a suitable base 4.

Supported on the side frame members and base are brackets and bracket arrangements for respectively supporting a pattern roll, 5, a transfer roll 6 and a conveyor 7 for work to be grained.

The pattern roll may be an intaglio cylinder such as a continuous etched copper plate, and this contacts with the gum surface of the transfer roll 6, shown as comprising a continuous annulus of gum material, such as congealed glue and glycerine. The pattern and transfer rolls may be adjustably mounted as shown in our copending application Serial No. 445,643, but they are shown here as carried by shafts mounted in fixed position in the side frame members.

The pattern roll is provided with pigment supply devices which, as shown, comprise an ink pan 60, an inking roll 61 and a doctor blade 62. The transfer roll 6 is provided with a scraper blade 80, which scrapes the excess pigment from the transfer roll after the pattern has been transferred to the subject being grained.

The conveyor 7 comprises, as shown, a general frame, the side members of which are shown in Fig. 3 at 30. These may be angle sections with horizontally disposed flanges connected by suitable cross members. Carried on the frame members 30 are a plurality of large and small rollers adapted to support work and carry it into contact with the transfer roll 6. The large rollers are indicated at 7a, 7b and 7c. The small rollers simply constitute work guides and are marked 31. The large rollers 7a and 7b are elements of work feeding mechanisms to be presently described, and the roller 7c is the platen or backing roll for the transfer roll 6.

To provide for vertical adjustment of the conveyor, the side frame members 30 of the conveyor frame are attached to respective sliding blocks 35 which are all similar in construction and are similarly numbered. The detailed construction of the blocks and supports is shown in our copending application Serial No. 445,643. The blocks are mounted on upright guide bars 36 secured as on pedestal members 37 in upright position on the base 4. There are four such guide bars, two at each side of the machine, and a block 35 on each bar. Each block may be suitably secured to the conveyor frame members 30 as by cooperating brackets 30a and 35a pinned together as at 35b.

It is desirable in some cases to provide for relative inclination between the conveyor or work support and the transfer roll and feed rolls to accommodate blanks with generally non-parallel surfaces. I may provide for this by the arrangement shown in Fig. 3, wherein the bracket 30a at the right has an elongated opening or slot for receiving the pin 35b. The corresponding bracket 30a at the left has a round opening for receiving the pin. By this arrangement the conveyor may be transversely tipped materially from the horizontal position shown, without binding.

Adjacent each guide bar is an upright screw 38, the screws being supported in suitable bearings on the respective pedestal members 37 and overhanging bearing brackets 39 surmounting the guide bars. Each screw extends freely through upper and lower ears 35' on the respective blocks 35 that is to say, the openings in the ears to receive the screws are not threaded and are slightly larger than the screws. Seated between the ears 35' of each block, as shown in Fig. 2, is a threaded nut 40, the nut being slidable horizontally slight distances in all directions, being guided on the horizontal adjacent surfaces of the ears 35'. The advantage of this is that the screws do not have to be accurately located with respect to the guide bars and blocks 35 in order to prevent binding of the screws. Each of the nuts may have a flat side closely adjacent a flat surface on the respective slide block, as at 35'' (Fig. 3), to prevent turning of the nut.

We have arranged for turning all of the screws simultaneously as follows: At each side of the machine, and extending parallel to the side frame members 1 and 2, are horizontal shafts 43. These shafts may be mounted in suitable brackets 44 carried on the base plate 4. The shafts are provided with beveled gears 45 in permanent mesh with corresponding bevel gears 46 rigid on respective upright screws 38. The arrangement for simultaneously turning both shafts 43 comprises, as shown, a centrally located longitudinally extending shaft 47 supported on brackets 48 and provided with a hand wheel 49 at the front end of the machine, which shaft has individual sprocket and chain connections 50 with the shafts 43.

In operation, it will be seen that turning the hand wheel 49 will raise or lower all four corners of the conveyor frame at once. The frictional contact between the screws 38 and the nuts 40 is sufficient to lock the conveyor frame in position, but additional means (not shown) may be provided if desired.

Instead of supporting the conveyor at the four corners of the frame it may have a three-point support. This may be arranged by providing a support on each side of the conveyor near the printing rolls in the manner already described. The third support at the outer end of the conveyor may comprise a separate pedestal with a guide bar on which is mounted a slide block which is connected to the conveyor frame. A vertical screw, supported for rotation by the guide bar and pedestal, may engage a threaded nut seated in the slide block. A pair of bevelled pinions may serve to operate the screw, one pinion being mounted on the lower end of the screw and the other being secured to a shaft operated from the same source which rotates the two screws near the printing rolls.

All the moving elements are preferably driven from a single source of power. This, as shown, comprises a motor 110 mounted at one side of the machine on the base plate 4. The motor has the usual connections for driving a reduction gearing unit 111 mounted adjacent the motor and on the base plate 4 and having a final driven shaft 112. The shaft carries a sprocket 113 which drives a sprocket chain 114 running over a sprocket 115 on the machine frame member 2. The sprocket 115 is carried on a stub shaft 117 mounted in the side frame member 2. In addition to the sprocket the stub shaft carries a spur gear 118 (Fig. 1) which meshes with and drives a spur gear 119 carried on a stub shaft 120. In order to change the driving speed of the pattern roll as its diameter is changed, the stub shaft 120 is supported in a pivoted bearing supporting bracket 122, mounted on the outside of the frame member 2 and arranged to be adjusted about the axis of the stub shaft 117, as by means of a handle 123. The bracket 122 has a guiding slot which receives a clamping stud by which the bracket may be held in adjusted position rigid with the side frame member 2. The spur gear 119 meshes with a spur gear 126 on a shaft 127 in fixed position in the frame member 2. The pattern roll is driven from the shaft 127 by reason of a sprocket chain 130 connecting suitable sprockets 131 and 132 on the shaft 127 and the roll shaft respectively. The gear 126 is removable from its shaft and whenever a different size pattern roll is substituted for the one then on the machine in the manner disclosed in our copending application Serial No. 445,643, it is possible to substitute a correspondingly different size gear for 126 to maintain the same peripheral speed of the pattern roll as before. Maintaining a definite speed is, of course, necessary where both the pattern and transfer roll are positively driven, as in the present machine, and as distinguished from a machine wherein one roll drives the other by friction.

Tracing the drive for the transfer roll from the shaft 117, driven as above described, this drive includes a sprocket 135 on the inside of the frame member 2 and carried rigidly on the shaft 117, Fig. 3. The sprocket 135 drives a chain 136 and this in turn drives a sprocket 137 mounted on a stub shaft 138 carried in the side frame member 2. The shaft 138 drives a spur gear 139 meshing with a spur gear 140 on a stub shaft 141. The latter shaft is supported partly by the frame member 2 directly and partly by a separate bracket secured to the frame member 2. Between the bracket 143 and the side frame member 2, there is a sprocket 145 driving a chain 146 which in turn drives a sprocket 147 on a shaft 148 mounted on the side frame member 2 above the shaft 141. The shaft 148, as shown in Figs. 1 and 3, carries an adjustable V pulley 149. A similar pulley 150 is carried on the end of the transfer roll shaft 22. A belt 151 connects the adjustable pulleys. The purpose of an adjustable V pulley arrangement is to provide fine adjustment in the drive between the shaft 148 and 22 in order to synchronize the peripheral speeds of the transfer roll and pattern roll and prevent blurring of the transferred pattern on the transfer roll in the event of changes in transfer roll diameter common in this type of machine. The adjustment is effected by moving the elements of the pulleys with respect to each other, as described in Patent No. 1,836,241, issued December 15, 1931, owned by the assignee hereof, causing the shafts 148 and 22 to be driven at the same speed or in overdriving or underdriving relationship, as required by the relative sizes of the transfer and pattern rolls.

The conveyor rolls 7a and 7b are driven from the pattern roll shaft 12, which drive will now be described. The pattern roll shaft 12 carries a sprocket 160 at the end adjacent the frame member 1, which drives a chain 161 passing over a sprocket 162 on a short shaft 163 carried in the frame member 1. The shaft 163 has an adjustable V pulley at 165, similar to those at 149 and 150. This, by means of a V belt 166, drives the adjustable V pulley 167 on a short shaft 168, also carried by the frame member 1 and extending through it. On the inside of the frame and mounted on the shaft 168 are two sprocket wheels 170 and 171, as shown in Fig. 3. The sprocket wheel 170, through a chain 172, drives a sprocket on a lay shaft 175, which latter shaft is carried on the conveyor frame in suitable brackets. Also carried on the shaft 175 is a sprocket 176 which drives a horizontally disposed chain 177 (see Fig. 2) in permanent driving connection with both conveyor rolls 7a and 7b, these having sprockets thereon at 178 and 179 respectively.

Because the conveyor must be operated at various heights, it is necessary to provide a considerable length of chain at 172. To take up the slack in this chain, we provide an idler arrangement, including a swingable arm 155 (Fig. 2), which is pivoted adjacent the frame member 1 and about the shaft 168. The arm carries two idler sprockets 156 and 157 bearing downwardly on the chain 172. The arm has a rearward extension with an arcuate slot 158 through which, and the frame member 1, a clamping bolt 159 extends for securing the arm in various positions.

Operating above the conveyor and registering with the conveyor rolls 7a and 7b are sets of feed rollers 190 and 210 on vertically swinging frames. The frames are automatically raised and lowered during the operation of the machine, to receive work and progress it through the machine on the conveyor.

The set of feed rolls 190 comprises, as shown, a series of short resilient disks on a shaft 191, see Figs. 2 and 3, supported in a rocking frame pivoted about a cross bar or shaft 192 having suitable end supports in the side frame members 1 and 2. The rocking frame comprises an arm 194 near the frame member 1, and an arm 195 near the frame member 2. The arm 195 is extended rearwardly or to the right, as shown in Fig. 1, and is there provided with a lateral extension 197 carrying a cam follower 198. The cam follower is actuated by a cam, best shown in Figs. 1 and 4 at 199 on a stub shaft 196, the shaft being driven by means of a sprocket chain 200 from the shaft 127, previously described. The cam has a depression 201 on one side which at predetermined intervals allows the cam follower 198 to drop and thereby raise the feed rollers 190 a sufficient amount to allow a new piece of work to pass between the feed rolls 190 and the conveyor roll 7a. The feed rollers 190 on the shaft 191 will, except for short intervals, bear down sufficiently to prevent the passage of a work piece into the machine until the proper time. The period of operation of the rollers may be varied by an arcuate adjustment device, shown in Fig. 1. This comprises a series of arcuate slots 202 and clamping screws 203 for fastening the cam in various turned positions on the shaft 196.

It is desirable to drive the set of feed rolls 190 as well as the conveyor roll 7a with which these register, particularly in case the work is large and heavy, to keep it moving through the machine when the work is passed thereunder. To do this, there is provided a sprocket chain 220 connecting the sprocket 171, previously mentioned as on the shaft 168, and a similar sprocket 221 on the shaft 192. Rigid with the sprocket 221 and carried on the shaft 192 is a spur gear 222 meshing with a spur gear 223 on the shaft 191, which carries the feed rollers. The spur gear arrangement permits the raising and lowering of the feed rollers without stretching the driving chain 220.

The ink roll 61 may also be driven from the shaft 192 by reason of a spur gear 225 meshing with a spur gear 226 on a shaft 227 carried in the side frame member 2, which latter shaft carries, exteriorly of the frame member 1, a sprocket 228, which through a chain 229, drives the shaft 75, on which the inking roll 61 is supported.

The support for the set of feed rollers 210 comprises a pair of arms 212, one of which is illustrated in Fig. 2. The arms are pivoted about a cross shaft 213 suitably supported in the main frame members 1 and 2. The arm shown in Fig. 2 has a cam follower at 214 arranged to engage a cam 215 on the shaft 163, previously described, and which carries the V pulley 165. The relationship of the cams 215 and 199 is such that the rollers 190 and 210 are raised alternately in order to prevent a workpiece passing beyond the rollers 190 before the rollers 210 have fed the active piece through the printing roll.

The sprocket 160, on the shaft of the pattern roll, is illustrated as being three times the diameter of the sprocket 162 on the shaft 163 which carries the cam 215. It follows from this, that the shaft 163 will make three revolutions for each revolution of the shaft 12, so that the feed rollers 210 will feed three workpieces at equally spaced points with reference to the periphery of the pattern roll. It is thus possible to place three different patterns in predetermined position upon the periphery of the pattern roll and produce a series of work blanks so that the first, second and third of each group will be substantially identical. Any slight inaccuracies of feed along the conveyor may be regulated by means of the V-pulley arrangement 165—167.

It will be obvious that by changing the relative sizes of the sprockets 160 and 162, it is possible to vary the number of workpieces fed during one revolution of the pattern roll. For instance, if the sprockets were of the same size, one piece would be fed for each revolution of the pattern roll.

Figs. 5 to 10 illustrate our invention as embodied in a slightly different type of machine. On a common base 303 are the side frames 301 and 302. These side frames carry the printing members which are shown as comprising a pattern roll 304, carried on a shaft 305, and a transfer roll 306 on its shaft 307. The scraper blade for the transfer roll is indicated at 308, and inking mechanism for the pattern roll is indicated in general at 309.

Beneath the transfer roll is a horizontally disposed conveyor, having side frame members 310 and 311, and intermediate longitudinal members 312 and 313. All of said members are connected by suitable cross members, of which the end member at the outer end of the conveyor is numbered 314. The conveyor rollers may be arranged in any manner desired, the arrangement illustrated comprising a platen roll 315 and other supporting rollers 316, adjacent the printing point, these rollers extending from side frame to side frame. The end of the conveyor from which the work blanks are fed, as shown, is provided with a plurality of work supporting and guiding rolls, in which the centrally located rollers 317 are in staggered relation to the rollers 318 located at the sides. In this form of conveyor all of the described rollers are journalled in the longitudinal members of the conveyor frame to rotate freely therein.

For feeding the workpieces along the conveyor, two chains 319 are provided, one on each side of the central series of rollers. These chains pass over sprockets 320 on a shaft 321, located at the inner or printing end of the conveyor, and over sprockets 322 on shaft 323 at the outer end of the conveyor. Beneath the conveyor are provided return idlers 324 and a chain tightening device, indicated in general at 325. Additional idlers 326 may be provided along the upper stretch of the feed chain, as desired. Positioning members 327 are connected to the feed chain in such a position as to pass above the rollers 317 and contact a workpiece on the conveyor rollers. The placing of the positioning bar will be later described.

To provide for vertical adjustment of the conveyor a three-point suspension has been illustrated. Adjacent the printing position, projections 330 extending from the sides of the conveyor, are supported in blocks 328, which are slidably supported in guides 329, carried by the side frames 301 and 302. The projections 330 may be so arranged as to pivotally support the conveyor in the blocks 328. The blocks have a threaded connection with upright screws 331, carried in suitable brackets on the side frames. The outer end of the conveyor is shown supported by a centrally located pedestal 332, in which a block 333 is slidably supported. The block 333 carries a head adapted to engage an opening in the end member 314 of the conveyor frame. The block 333 has a threaded connection with an upright screw 334, journalled in the pedestal. For moving the three conveyor blocks up or down simultaneously, there is provided a cross-shaft 335, engaging the upright screws 331, by means of bevelled gears, and this cross-shaft has a bevelled gear connection with a longitudinal shaft 336, extending to the pedestal 332, and having a bevelled gear connection with the upright groove 334. Where the longitudinal shaft drives at an angle, it may be provided with universal joints, as indicated at 337. The shaft 335 is provided with a handle 338, for simultaneously rotating the upright screws 331 and 334 to raise or lower the conveyor bodily.

For driving the various elements, there is provided a motor 340, connected to a gear reduction unit 341, whose final driven sprocket is indicated at 342. From this sprocket, by means of chain 343, shaft 344 is driven. From this shaft the transfer roll shaft 307 is driven by means of the V-pulley arrangement 345—346—347, shaft 348 and chain 349. On the shaft 344 is a gear 350, meshing with gear 351, rigidly connected with and driving shaft 352.

The pattern roll and the conveyor are both driven from the shaft 352. The pattern roll drive is illustrated as a chain 353, but it will be understood that the pattern roll may be driven through an adjustable V-pulley arrangement, as illustrated in Figs. 1 to 4, and that changeable gear pairs may be supplied for different sizes of pattern rolls, as has been described.

The conveyor drive from the shaft 352 is by means of a jaw clutch, one member of which 354 has a splined connection with the shaft, and the other member of which 355 is associated with a sprocket, both of which rotate freely upon the shaft 352. Upon engaging the jaw clutch the chain 356 is driven, which rotates the bevel gear 357, carried in a suitable bracket 358 upon the side frame 302. Suitably journalled in the bracket 358 is a vertical shaft 359 extending alongside the conveyor frame. At its lower end the shaft carries a bevelled gear 360, rigid with it, and meshing with the bevel gear 357. Slidable upon the upper end of the shaft 359 is a bevelled gear 361, journalled in a bracket 362, carried by the conveyor frame. This bevelled gear 361 has a splined connection with the shaft 359. Carried by the bracket 362 is a second bevelled gear 363, meshing with 361, and driving, through a stub-shaft and sprocket, the chain 364 which in turn drives the shaft 365, journalled in the conveyor frame. Rigid on the shaft 365 is a gear 366, meshing with a gear 367, which drives the shaft 321. This is the shaft previously referred to, which carries the sprockets 320 by means of which the feed chains 319 are driven.

It will be noted that whatever the vertical adjustment of the conveyor may be, bevelled gear 361 will slide freely up and down the shaft 359, and be driven thereby.

When it is desired to print duplicate workpieces, the length of the chains 319 will be a multiple of the periphery of the pattern roll 304. In the illustration the feed chain is twice the length of the periphery of the pattern roll. Since the pattern roll and the feed chain are in geared relation to a common drive, and the length of the conveyor chain is a multiple of the distance about the periphery of the printing roll, a given point on the conveyor chain will always coincide with a certain position on the periphery of the printing roll. Thus the positioning members or timing bars 327 may be placed in a predetermined position on the chain 319, so that the workpiece fed by a given positioning member will be a substantial duplicate each time that positioning member comes around. To aid in placing such positioning members 137, we have indicated a scale 368, near one side of the conveyor, which enables the making of fine adjustments.

We claim:

1. In a graining machine, a frame, pattern and transfer rolls supported thereby, means to supply pigment to the pattern roll, means for driving the rolls, a horizontally disposed conveyor below the transfer roll, means for adjusting the conveyor bodily in a vertical direction, and means for driving the conveyor in all of the adjusted positions, and means for feeding workpieces along said conveyor and beneath the transfer roll in timed relation with the pattern roll driving means.

2. In a graining machine, a frame, a pattern roll and a transfer roll supported by the frame, means to supply a pigment pattern to the transfer roll, means for driving the rolls, a horizontally disposed conveyor below the transfer roll, means for adjusting the conveyor bodily in a vertical direction means for driving the conveyor in all of the adjusted positions, and means for progressing a workpiece along said conveyor in a predetermined relation to the periphery of the pattern roll.

3. A conveyor for conveying work to a graining machine, said conveyor including a plurality of rolls arranged to support work covering a comparative large area, a pair of vertically reciprocable feed rolls, and means to alternately operate the said feed rolls in relationship to cause one roll to be raised to receive the work blank as said blank has its advancing edge presented by said other roll.

4. A conveyor for feeding work to a graining machine having a frame supporting printing rolls including a driven pattern roll and having means to supply a pigment pattern to the printing rolls, said conveyor being movably arranged below the printing rolls and comprising a frame and a plurality of rolls thereon, there being feeding devices including spaced rolls above the conveyor, and means to alternately raise the feed rolls, whereby one or the other of the feed rolls is at all times in work feeding position.

5. A conveyor to convey work to a graining machine having a pair of side frame members and a roll carried on the side members for transferring a pigment pattern to work in the machine, said conveyor being disposed between the side members, and including a plurality of rolls, means for positively driving two of the rolls, and vertically reciprocable feeding rolls associated with the respective driven rolls of the conveyor, means for driving the feed rolls to reciprocate them toward and away from work on the conveyor in timed relation, and means for positively driving one of the feed rolls.

6. In a graining machine, a pair of side frame members, roll means including a pattern roll carried on the side members for transferring a pigment pattern to work in the machine, means for driving the pattern roll, a conveyor disposed between the side members, means for positively advancing work along the conveyor in timed relation to the movement of the periphery of the pattern roll, means for retarding the advance of the work along the conveyor, and means for interrupting the action of said retarding means, said last-named means being operated in timed relation to the pattern roll drive.

7. A conveyor for feeding work to a graining roll comprising a frame movably mounted to be adjusted a substantial distance toward and away from the roll, a plurality of rolls on the frame, one adapted to be driven to advance work to the first-mentioned roll, a sprocket wheel on the frame, and a sprocket chain for driving the said conveyor roll driven from the sprocket wheel, there being an idler device for taking up the slack in said driving chain including an arm pivoted about the axis of the drive sprocket, said arm carrying an idler for engaging the chain, and means for locking the arm in adjusted position.

8. In a graining machine, a rotatable member adapted to print a pigment pattern, a conveyor for work disposed adjacent said member and comprising a plurality of work carrying rollers, said conveyor being adjustable to accommodate work blanks of various thicknesses, there being driving means for one of the conveyor rolls including a driving wheel and a sprocket chain, and chain tension adjusting means pivotally movable about the axis of said driving wheel, said means including a pair of idlers engaging opposite stretches of the chain.

9. A conveyor for a graining machine having roll means to transfer a pigment pattern to work in the machine, said conveyor supporting work pieces of various thicknesses in contact with the roll means, and including a plurality of vertical slide members, and blocks slidingly connecting the conveyor to each of the slide members, screws associated with each of the slide members, and passing through said respective blocks, and a connecting gearing including a part adapted to be manually operated to simultaneously turn all of the screws.

10. A conveyor for a graining machine having a roll adapted to apply a pigment pattern to a work blank and a frame supporting the roll, said conveyor being arranged within the frame and disposed adjacent the roll and adapted to support such work, said conveyor having a support comprising a plurality of upright guiding members, screws associated with respective guiding members, and means to simultaneously turn the screws, there being supporting brackets associated with each guiding member, and nut members carried by the brackets threadingly embracing respective screws, said nut members each having horizontal play on the brackets while being prevented from turning, whereby the screws will not bind in raising and lowering the conveyor.

11. A conveyor for conveying work to a rotatable member journalled in a frame and adapted to print a pigment pattern, said conveyor being disposed adjacent said rotatable member and being vertically adjustable to accommodate work blanks of various thicknesses, there being means for progressing work along the conveyor, and driving means for said work-progressing means comprising a vertical shaft having its lower end journalled in the frame and its upper end journalled in a bracket on the conveyor, a bevel-gear carried by the bracket and slidable on the shaft and having a splined connection with the shaft, a second bevel-gear carried by the bracket and coacting with said first-named gear, an operative connection between the second gear and the work-progressing means, and means for rotating the vertical shaft.

12. In a graining machine a frame, a pattern roll supported thereby, means to print a pigment pattern from the pattern roll, means for driving the pattern roll, a work-supporting conveyor adjacent the printing means, a chain for progressing work along the conveyor, means for driving the chain in timed relation with the pattern roll drive, and means on the chain for contacting a work blank.

13. In a graining machine a frame, a pattern roll supported thereby, means to print a pigment pattern from the pattern roll, means for driving the pattern roll, a work-supporting conveyor below the pattern roll, a chain for progressing work along the conveyor, the length of said chain being substantially a multiple of the circumference of the pattern roll, means for driving the chain in timed relation with the pattern roll drive, and means on the chain for feeding a work blank.

14. In a graining machine, the combination of a frame, printing rolls including a pattern roll supported by the frame, means to supply pigment to the pattern roll, means for driving the pattern roll, a work-supporting conveyor adjacent the printing rolls, means to adjust said conveyor bodily to various heights, an endless chain carried by said conveyor and adapted to progress work blanks therealong, means for driving said chain in any of the adjusted positions of the conveyor, and said chain driving means acting in timed relation with the pattern roll driving means.

GUIDO VON WEBERN.
EDWARD W. HAMANT.